United States Patent
Teillet et al.

(10) Patent No.: US 8,838,043 B2
(45) Date of Patent: Sep. 16, 2014

(54) MULTIBAND ACTIVE-PASSIVE BASE STATION ANTENNA

(75) Inventors: Anthony Teillet, Trabuco Canyon, CA (US); Khurram Parviz Sheikh, San Clemente, CA (US)

(73) Assignee: Powerwave Technologies S.A.R.L., Luxembourg (LU)

( * ) Notice: Subject to any disclaimer, the term of this patent is extended or adjusted under 35 U.S.C. 154(b) by 0 days.

(21) Appl. No.: 13/604,416

(22) Filed: Sep. 5, 2012

(65) Prior Publication Data

US 2013/0090076 A1   Apr. 11, 2013

Related U.S. Application Data

(60) Provisional application No. 61/531,281, filed on Sep. 6, 2011.

(51) Int. Cl.
| | |
|---|---|
| H04B 1/38 | (2006.01) |
| H01Q 23/00 | (2006.01) |
| H04B 1/04 | (2006.01) |
| H01Q 21/24 | (2006.01) |
| H01Q 21/00 | (2006.01) |
| H01Q 3/34 | (2006.01) |
| H04M 1/00 | (2006.01) |
| H04B 1/18 | (2006.01) |

(52) U.S. Cl.
CPC ........... *H01Q 21/0006* (2013.01); *H01Q 23/00* (2013.01); *H04B 1/0458* (2013.01); *H01Q 21/24* (2013.01); *H01Q 3/34* (2013.01); *H04B 1/18* (2013.01)
USPC ........................................... 455/73; 373/702

(58) Field of Classification Search
USPC ............ 455/73, 552.1, 553.1, 562.1; 343/702
See application file for complete search history.

(56) References Cited

U.S. PATENT DOCUMENTS

| | | | |
|---|---|---|---|
| 2010/0113097 A1 | 5/2010 | Seeor | |
| 2010/0197261 A1* | 8/2010 | Zibrik et al. | 455/232.1 |
| 2011/0159810 A1 | 6/2011 | Kenington | |

FOREIGN PATENT DOCUMENTS

EP        2341577 A1    7/2011

\* cited by examiner

*Primary Examiner* — Lee Nguyen
(74) *Attorney, Agent, or Firm* — Knobbe Martens Olson & Bear, LLP

(57) ABSTRACT

Generally described, the present disclosure relates to antennas with an active component and a passive component, generally referred to as an active-passive antenna. More specifically, aspects of the present application include a combination of an active antenna element configured to process communications in accordance with a first frequency bandwidth and a passive antenna element configured to process communication in accordance with a second frequency bandwidth. Still further, the present disclosure includes the integration of the active and passive antenna components as well as the utilization of components of traditional active array antennas to allow the incorporation of the active-passive antenna in the same form factor previously utilized for solely active array antennas.

20 Claims, 5 Drawing Sheets

MULTIBAND ACTIVE-PASSIVE BASE STATION ANTENNA

CROSS-REFERENCE TO RELATED APPLICATION

This application claims the benefit of U.S. Provisional Patent Application No. 61/531,281, entitled MULTIBAND ACTIVE-PASSIVE BASE STATION ANTENNA, and filed on Sep. 6, 2011, the entirety of which is incorporated herein by reference.

BACKGROUND

Base station antenna deployment has generally been done with passive antennas, such as fixed electrical tilt (FET), mechanical electrical tilt (MET), and remote electrical tilt (RET) antennas. Over the years, the increased use of spectrum has resulted in increased complexity starting from mostly single band FET antennas gradually moving to multi-band RET antennas. However, these antennas are passive antennas, and do not contain any active RF devices such as amplifiers and radios within the antenna. Therefore, these antennas still have significant RF losses from the radiating element to the first active device. For example, the first active device can be a NodeB, a Tower Mounted Amplifier (TMA), or a Remote Radio Head (RRH). The magnitude of these RF losses can be in the order of several dB, which can significantly affect system performance.

In active antenna environments, RF losses disappear because active devices, such as low noise amplifiers (LNAs) in the uplink path or power amplifiers (PAs) in the downlink path, are brought into as close as possible to the antenna radiating element. The proximity of the antenna radiating element to the active devices mitigates many of the losses associated with passive antenna radiating elements, such as feed network losses, phase shifter losses, and cable feeder losses. The beam can be then formed with an electronic phase shifter, in the analog or digital domain.

In an active antenna, an array of broadband radiating elements can be combined with distributed modules. Each distributed module may contain a double triplexer, double LNA, double PA, phase shifters and attenuators, and may also be combined with a passive feed network, with a passive phase shifter. These modules are compact and essential building blocks of the all antennas. While operators are very pleased with the improved performance that can be brought by active antennas, the challenge remains when multiple technologies, such as second generation air interface standards ("2G"), third generation air interface standards ("3G"), and fourth generation air interface standards ("4G") are combined on the same tower, or on the same antenna due to tower loading and zoning restrictions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure relates to antennas with an active component and a passive component, generally referred to as an active-passive antenna. More specifically, aspects of the present application include a combination of an active antenna element configured to process communications in accordance with a first frequency bandwidth and a passive antenna element configured to process communication in accordance with a second frequency bandwidth. Still further, the present disclosure includes the integration of the active and passive antenna components as well as the utilization of components of traditional active array antennas to allow the incorporation of the active-passive antenna in the same form factor previously utilized for solely active array antennas.

Figure 1:
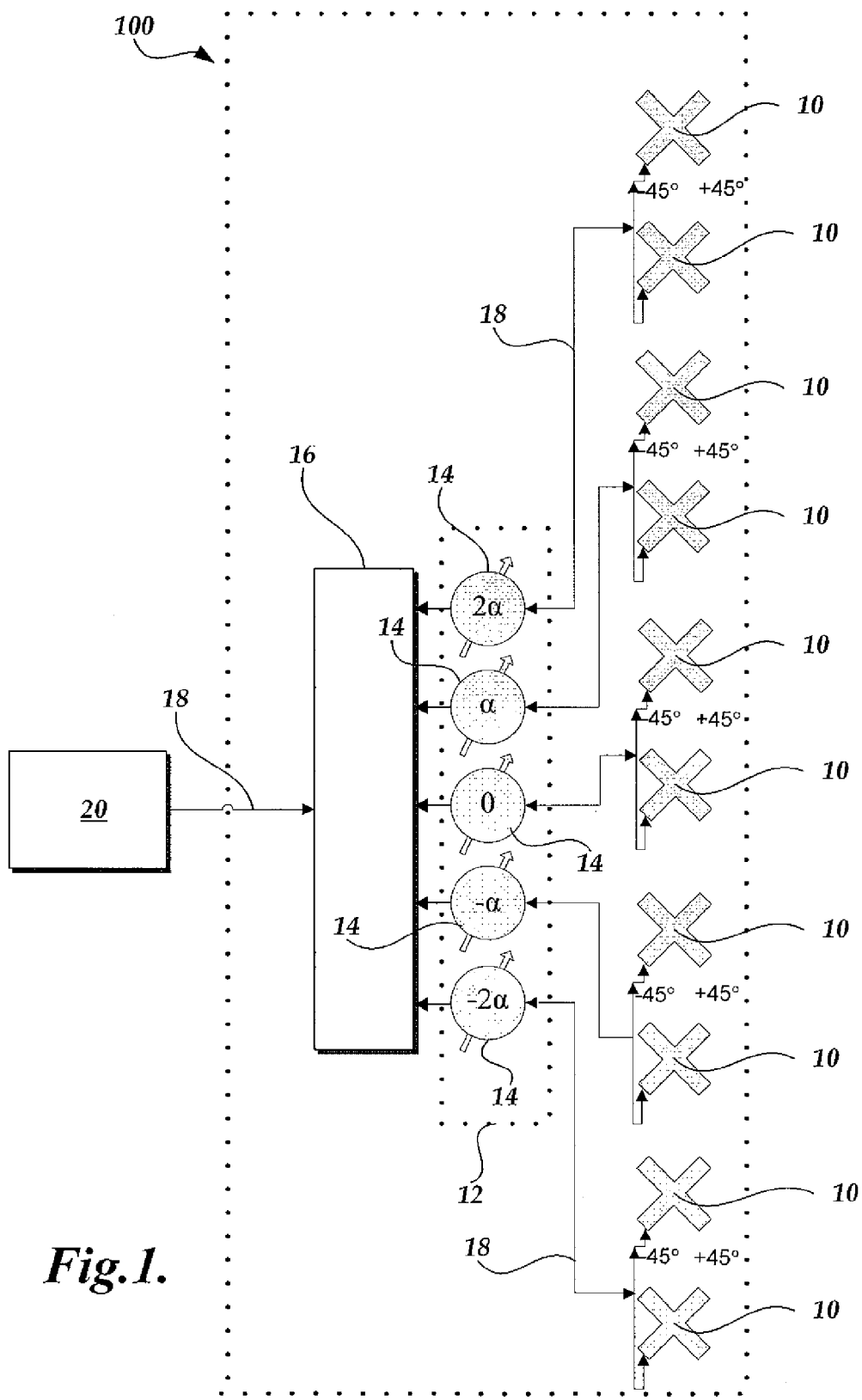
FIG. 1 is an illustration of a connection between a radiating element, passive antenna components, and an active radio frequency device.

FIG. 1 illustrates a connection between a set of radiating elements 10 and a first active device 20, where only passive antennas are present. The embodiment shown in FIG. 1 illustrates a single polarization example, such as for example +/−45° polarization. In other embodiments, different angles of polarization, or different numbers of polarization, may be possible. With continued reference to FIG. 1, the radiating elements are connected to an antenna feed network 12, forming the passive antenna. Illustratively, the antenna feed network may include a corporate feed network (now shown) and a plurality of passive phase shifters 14 attached to a remote electrical tilt (RET) antenna (not shown). The passive antenna feed network 12 may be configured to handle high power, for example about 250W per port. The signals from the antenna feed network 12 may then be fed into a combiner/divider 14 and the combined signal may then be sent out via an RF connector 18 to an active component 20. The active component 20 can be for example, a NodeB, a Tower Mounted Amplifier (TMA), or a Remote Radio Head (RRH). One skilled in the art will appreciate that passive antennas which do not contain any active RF devices such as amplifiers and radios within the antenna generally have significant RF losses from the radiating element to the active component 20.

Figure 2A:
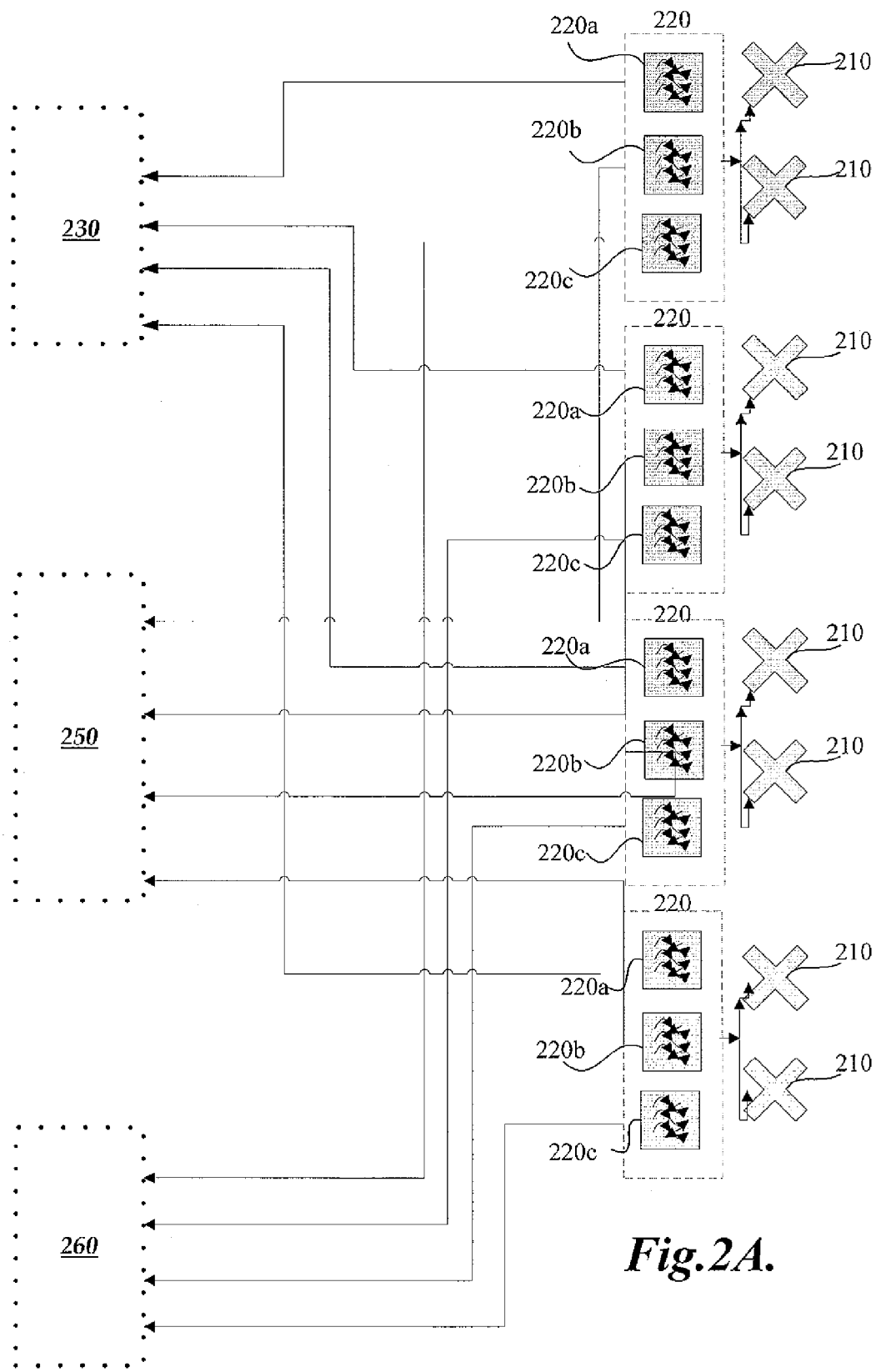
FIGS. 2A-2D are block diagrams illustrative of various components of an active-passive antenna.
Figure 2B:
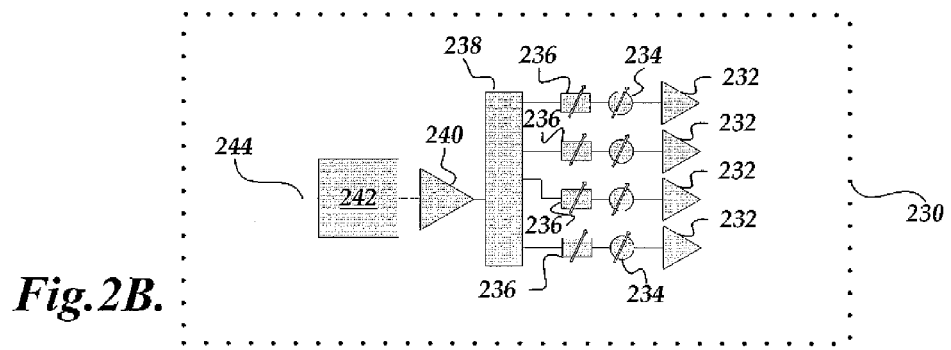
Figure 2C:
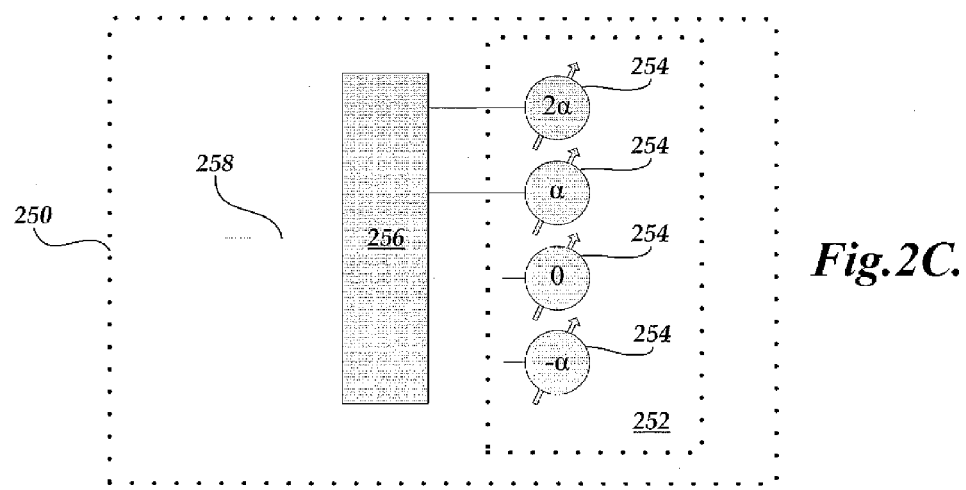

FIGS. 2A-2C are block diagrams of embodiments of an active-passive antenna 200. Similar to the embodiment illustrated in FIG. 1, the embodiment shown in FIGS. 2A-2C illustrate a single polarization example, such as for example +/−45° polarization. In other embodiments, different angles of polarization, or multiple numbers of polarization may be possible. The active-passive antenna illustrated in FIGS. 2A-2C may, in some embodiments, cover an Advanced Wireless Systems (AWS) Band with Long-Term Evolution (LTE) technology with an active component, and may also cover a Personal Communications Service (PCS) Band with a passive component.

With reference to FIG. 2A, there are sets of distributed double triplexers 220, behind each pair of radiating element 210. Generally, triplexers 220 are used to separate the different bands of frequencies on the up and down links in both active and passive components. In some embodiments, the triplexers 200 may separate signals in downlink(s) (DL) and uplink(s) (UL) in a passive band and in an active band. Double triplexers 220 cover two-slant polarization (such as for example +/−45°, and the like). In other embodiments, different types of triplexers, or other multiplexers may be used to cover different levels and/or angles of polarization may be implemented. Additionally, while four pairs of radiating elements 210 and triplexers 220 are illustrated in FIG. 2A, one skilled in the relevant that different number of radiating elements may be incorporated into an active-passive antenna 200.

With continued reference to FIG. 2A, the double triplexers 220 may define three branches 220a, 220b and 220c of the active-passive antenna 200. Branch 220a of each of the triplexers may connect to a first active antenna component 230, which will be described with regard to FIG. 2B. Branch 220b of each of the triplexers may connect to a passive antenna component 250, which will be described with regard to FIG. 2C. Additionally, branch 220c of each of the triplexers may connect to a second active antenna component 260, which will be described with regard to FIG. 2D. One skilled in the relevant art will appreciate that in the event that only a single active component is included in the active-passive antenna 200, branch 220c and the second active antenna component 260 can be omitted.

Referring now to FIG. 2B, the first active component 230 can include a distributed LNA 232 for each triplexer 220 in the active-passive antenna 200. A distributed LNA 232 helps to minimize the system noise figure. In some embodiments, the LNA 232 may include an amplifier and an analog predistortion (APD) module. After the LNA 232, an electronic phase shifter 234 may be used to add flexibility to the vertical beam forming of the signal on branch 220a. The electrical phase shifter 234 may have a wide range of vertical downtilt, and variable upper side lobe suppression (USLS) to maximize antenna gain and/or minimize interference from adjacent cell site. From the electrical phase shifter 234, the signal may be input to an electronic attenuator 236. The signals from the branches 220a of the plurality of triplexers 220 may then be fed into a combiner/divider 238 and the combined signal may then be fed into a preamplifier 240 before being fed into a radio transmitter 242. The radio transmitter 242 may have a standard base station interface 244, such as for example a common public radio interface (CPRI), in order to transmit to other base stations. The passive-active antenna 200 may in some embodiments cover an active uplink channel ("UL") in the 1710-1755 MHz band, such as the band used in LTE technology via the signals on the branch 220a of the triplexers 220.

With reference now to FIG. 2C, the passive antenna component 250 can include a passive antenna feed network 252. In some embodiments, the antenna feed network 252 may include a corporate feed network (now shown) and a plurality of passive phase shifters 254 attached to a remote electrical tilt (RET) antenna (not shown). The passive antenna feed network 252 may be configured to handle high power, for example about 250W per port. The signals from the antenna feed network 252 may then be fed into a combiner/divider 256 and the combined signal may then be sent out via an RF connector 258. The passive-active antenna 200 may in some embodiments cover a passive uplink channel in the 1850-1995 MHz band, such as the band used in personal communication services ("PCS") technology via the signals on branch 220b of the triplexers 220.

Figure 2D:
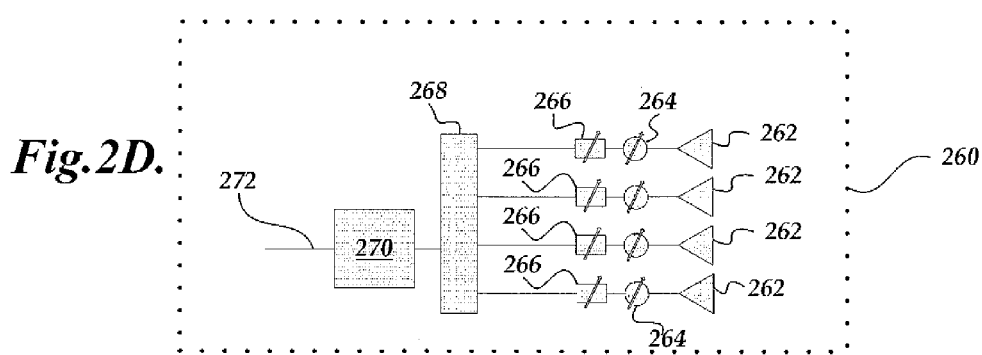

Turning now to FIG. 2D, as previously discussed, in some embodiments, a second active antenna component 260 may also be active in some embodiments. The second active antenna component 260 may be connected, via a standard interface 272, to the input of a radio receiver 270. The signal received by the radio receiver 270 may be split by the divider/combiner 268 to be distributed to electronic attenuators 266 and electronic phase shifters 264, and distributed power attenuators (PA) 262. The signals from each of the PAs 262 may then be fed into each of the 220c branch of the triplexers 220. The active-passive antenna 200 may in some embodiments cover an active downlink channel ("DL") in the 2110-2155 MHz band, such as the band used in LTE Technology via the signals on branch 220c of the triplexers 200.

Below is a list of examples of different combinations of passive frequencies and active UL and DL frequencies where using a single broad band element can be combined with multiplexers to obtain an integrated active-passive base station antenna array, for various bandwidths of radiating elements, using the embodiments described herein. Other variations of spectrum block usage may also be available, depending on countries/region/operators. Accordingly, the examples indicating in the present disclosure and the below table should not be construed as limiting.

| Radiating Element Bandwidth 1710-2170 MHz: | | |
| --- | --- | --- |
| 1710-1755 MHz Active UL | 1850-1995 MHz Passive | 2110-2155 MHz Active UL |
| 1710-1755 MHz Passive | 1850-1910 MHz Active UL* 1930-1995 Active DL* (in this combination, a quadplexer may be used) | 2110-2155 MHz Passive |
| 1710-1880 MHz Passive | 1920-1980 MHz Active UL | 2110-2155 MHz Active DL |
| 1710-1780 MHz Active UL | 1810-1880 Active DL | 1920-2170 MHz Passive |
| Radiating Element Bandwidth 1920-2690 MHz: | | |
| 1920-1980 MHz Active UL | 2110-2155 MHz Active DL | 2500-2690 MHz Passive |
| 1920-2170 MHz Passive | 2500-2570 MHz Active UL | 2620-2690 MHz Active DL |
| Radiating Element Bandwidth 698-894 MHz: | | |
| 698-716 MHz Active UL | 728-746 MHz Active DL | 824-894 MHz Passive |
| 698-787 MHz Passive | 824-849 MHz Active UL | 869-894 MHz Active DL |
| Radiating Element Bandwidth 790-960: | | |
| 790-821 MHz Active DL | 832-862 MHz Active UL | 890-960 MHz Passive |
| 790-862 MHz Passive | 890-915 MHz Active UL | 935-960 MHz Active DL |

Figure 3:
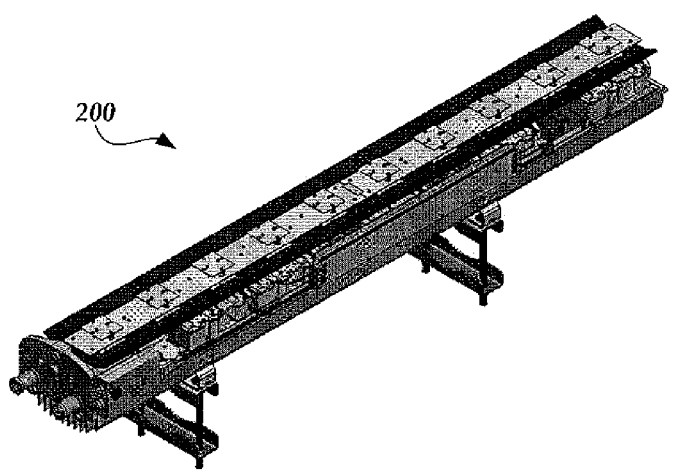
FIG. 3 is a perspective view of an active array antenna including an embodiment of the active-passive antenna.
Figure 4:
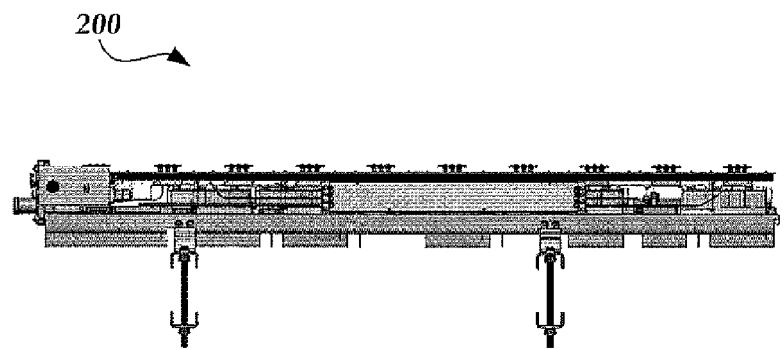
FIG. 4 is a side view of an active array antenna including an embodiment of the active-passive antenna.

FIG. 3 is a perspective view an embodiment of the active-passive antenna 200. FIG. 4 correspond to a side view of an active array antenna 200. As illustrated in FIGS. 3 and 4, the use of an active-passive antenna 200 allows for a reduced physical footprint of an active-passive antenna 200. More specifically, in one aspect, the dimensions of an active-passive antenna 200 will be substantially the same as a passive antenna component, such as the antenna component illustrated in FIG. 1. Accordingly, no modification of the dimensions of the active-passive antenna 200 to allow for the inclusion of one or more active modes. In some embodiments, multiplexers already present or configured for an antenna are used to enable the active-passive antenna 200 to operate in both active and passive bands. The reuse of components thus enables the active-passive antenna 200 to remain in the same form factor as before the addition of the passive band.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An active-passive antenna comprising:
a plurality of radiating components; and
a plurality of triplexers coupled to the plurality of radiating elements, wherein each of the plurality of triplexers defines three distinct branches of the active-passive antenna corresponding to:
a first branch associated with first active antenna components;
a second branch associated with passive antenna components; and
a third branch associated with second active antenna components.

2. The active-passive antenna of claim 1, wherein at least one of the plurality of triplexers is a double triplexer associated with pairs of radiating elements from the plurality of radiating elements.

3. The active-passive antenna of claim 1, wherein at least one of the plurality of triplexers covers two-slant polarization.

4. The active-passive antenna of claim 1, wherein the first active antenna components include, for each of the plurality of triplexers, a distributed low noise amplifier, an electronic phase shifter, an electronic attenuator, a combiner/divider, a preamplifier and a radio transmitter.

5. The active-passive antenna of claim 1, wherein the first active antenna components correspond to an active uplink communication channel.

6. The active-passive antenna of claim 5, wherein the active uplink communication channel corresponds to a range of frequencies between 1710 MHz to 1755 MHz.

7. The active-passive antenna of claim 1, wherein the passive antenna components include an antenna feed network and a combiner/divider.

8. The active-passive antenna of claim 7, wherein the antenna feed network corresponds to a plurality of passive phase shifters.

9. The active-passive antenna of claim 7, wherein the passive antenna components correspond to a passive uplink communication channel.

10. The active-passive antenna of claim 9, wherein the passive active uplink communication channel corresponds to a range of frequencies between 1850 MHz to 1995 MHz.

11. The active-passive antenna of claim 1, wherein the second active antenna components include, for each of the plurality of triplexers, a radio transmitter, a preamplifier, a combiner/divider, an electronic attenuator, an electronic phase shifter, and a distributed low noise amplifier.

12. The active-passive antenna of claim 1, wherein the second active antenna components correspond to an active downlink communication channel.

13. The active-passive antenna of claim 12, wherein the active uplink communication channel corresponds to a range of frequencies between 2110 MHz to 2155 MHz.

14. An active-passive antenna comprising:
a plurality of radiating components;
a first set of active components defined an active uplink channel for the plurality of radiating components;
a set of passive components defined a passive uplink channel for the plurality of radiating components; and
a plurality of triplexers defining branches to the first set of active components and the set of passive components.

15. The active-passive antenna of claim 14 further comprising a second set of active components defined an active downlink channel for the plurality of radiating components.

16. The active-passive antenna of claim 15, wherein the second set of active components include a radio transmitter, a preamplifier, a combiner/divider, a set of electronic attenuators, a set of electronic phase shifters, and a set of distributed low noise amplifiers.

17. The active-passive antenna of claim 14, wherein the first active components include a set of distributed low noise amplifiers, electronic phase shifters, electronic attenuators, a combiner/divider, a preamplifier and a radio transmitter.

18. The active-passive antenna of claim 14, wherein the set of passive components include an antenna feed network and a combiner/divider.

19. An active-passive antenna comprising:
a plurality of radiating components;
means for forming an active uplink channel for the plurality of radiating components wherein the means for forming an active uplink channel include a plurality of triplexers defining branches between the active uplink channel and the plurality of radiating components; and means for forming a passive uplink channel for the plurality of radiating components wherein the means for forming a passive uplink channel include a plurality of triplexers defining branches between the passive uplink channel and the plurality of radiating components.

20. The active-passive antenna of claim 19 further comprising means for forming an active downlink channel for the plurality of radiating components.

* * * * *